United States Patent
Ha

(10) Patent No.: US 11,035,987 B2
(45) Date of Patent: Jun. 15, 2021

(54) LIQUID LENS MODULE, CAMERA MODULE INCLUDING THE SAME, OPTICAL DEVICE INCLUDING THE SAME, AND METHOD FOR MANUFACTURING THE LIQUID LENS MODULE

(71) Applicant: LG INNOTEK CO., LTD., Seoul (KR)

(72) Inventor: Tae Min Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/480,952

(22) PCT Filed: Jan. 26, 2018

(86) PCT No.: PCT/KR2018/001176
§ 371 (c)(1),
(2) Date: Jul. 25, 2019

(87) PCT Pub. No.: WO2018/139894
PCT Pub. Date: Aug. 2, 2018

(65) Prior Publication Data
US 2019/0391300 A1    Dec. 26, 2019

(30) Foreign Application Priority Data
Jan. 26, 2017    (KR) .................. 10-2017-0013051

(51) Int. Cl.
*G02B 3/14*    (2006.01)
*G02B 7/02*    (2021.01)
(Continued)

(52) U.S. Cl.
CPC .............. *G02B 3/14* (2013.01); *G02B 7/02* (2013.01); *G02B 7/28* (2013.01); *G02B 27/64* (2013.01); *G03B 13/36* (2013.01)

(58) Field of Classification Search
USPC ......................................................... 396/111
See application file for complete search history.

(56) References Cited

U.S. PATENT DOCUMENTS

| | | | |
|---|---|---|---|
| 9,952,358 B2 * | 4/2018 | Karam | G02B 3/14 |
| 2007/0127102 A1 * | 6/2007 | Obinata | G02B 26/005 |
| | | | 359/665 |

(Continued)

FOREIGN PATENT DOCUMENTS

| | | |
|---|---|---|
| CN | 101458346 A | 6/2009 |
| JP | 2014-202804 A | 10/2014 |

(Continued)

*Primary Examiner* — Rodney E Fuller
(74) *Attorney, Agent, or Firm* — Birch, Stewart, Kolasch & Birch, LLP

(57) ABSTRACT

A liquid lens module includes a first housing having a first hole formed therein to allow a first lens unit to be coupled thereto, a lower connection substrate coupled to the first housing, an upper connection substrate disposed on the lower connection substrate, the upper connection substrate being coupled to the first housing, and a liquid lens disposed between the lower connection substrate and the upper connection substrate, the liquid lens being configured to be electrically connected to the lower connection substrate and to the upper connection substrate. The upper connection substrate includes an opening that is larger than the liquid lens. The opening is disposed at a position corresponding to the first hole in an optical-axis direction.

20 Claims, 9 Drawing Sheets

(51) Int. Cl.
*G02B 7/28* (2021.01)
*G02B 27/64* (2006.01)
*G03B 13/36* (2021.01)

(56) References Cited

U.S. PATENT DOCUMENTS

| | | | |
|---|---|---|---|
| 2008/0112059 A1* | 5/2008 | Choi | G02B 7/026 |
| | | | 359/664 |
| 2008/0267603 A1 | 10/2008 | Jung et al. | |
| 2010/0020407 A1* | 1/2010 | Takai | G02B 3/14 |
| | | | 359/666 |
| 2010/0302646 A1* | 12/2010 | Takai | G02B 3/14 |
| | | | 359/665 |
| 2012/0075714 A1 | 3/2012 | Tanaka et al. | |
| 2012/0113525 A1 | 5/2012 | Kong et al. | |
| 2016/0187613 A1 | 6/2016 | Seo et al. | |
| 2017/0363838 A1 | 12/2017 | Jeong | |
| 2019/0129076 A1* | 5/2019 | Choi | H04N 5/23258 |
| 2019/0317251 A1 | 10/2019 | Choi | |
| 2019/0324346 A1 | 10/2019 | Lee | |
| 2019/0346593 A1* | 11/2019 | Lee | G02B 26/004 |
| 2019/0384137 A1 | 12/2019 | Lee et al. | |
| 2020/0089077 A1 | 3/2020 | Eom et al. | |

FOREIGN PATENT DOCUMENTS

| | | |
|---|---|---|
| KR | 10-0843473 B1 | 7/2008 |
| KR | 10-2011-0108183 A | 10/2011 |
| KR | 10-2016-0081243 A | 7/2016 |
| KR | 10-2016-0090018 A | 7/2016 |
| WO | WO 2010/114254 A2 | 10/2010 |
| WO | WO 2018/151527 A1 | 8/2018 |

* cited by examiner

【FIG. 1】
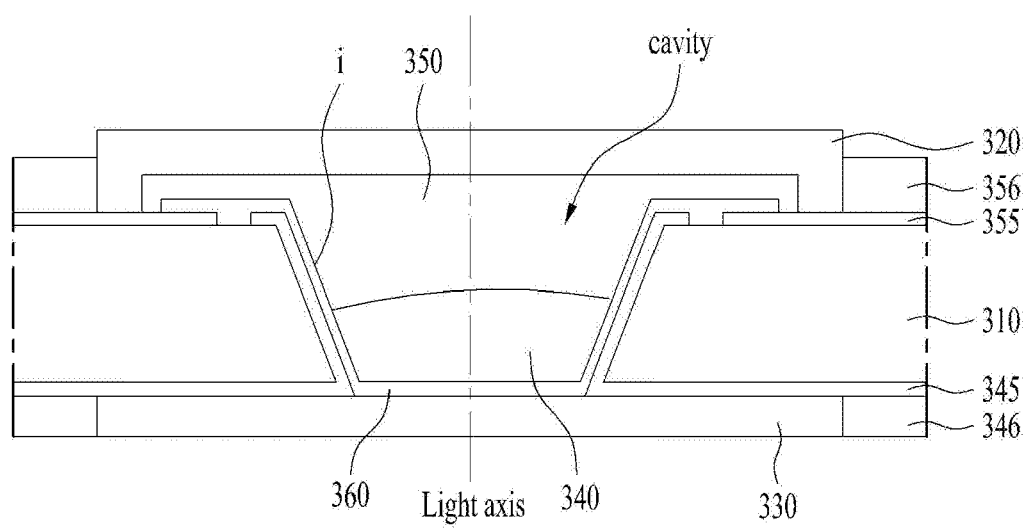
【FIG. 2a】
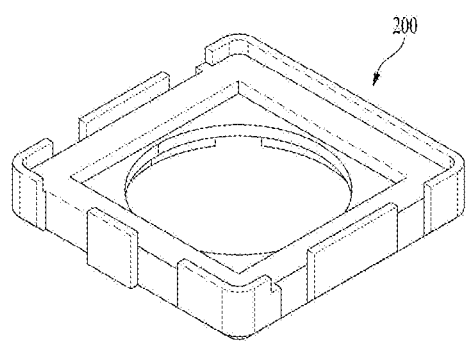

【FIG. 2b】
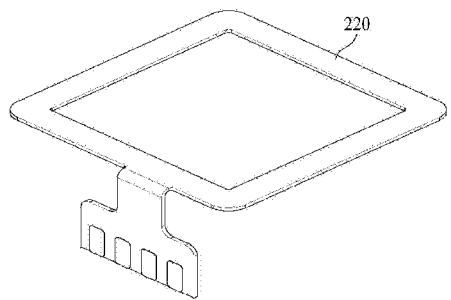
【FIG. 2c】
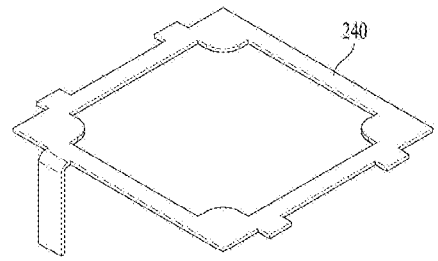
【FIG. 2d】
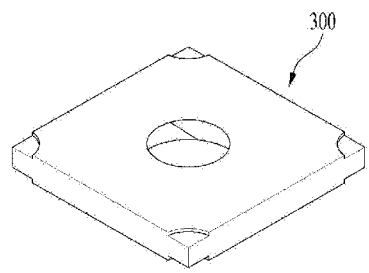

[FIG. 2e]
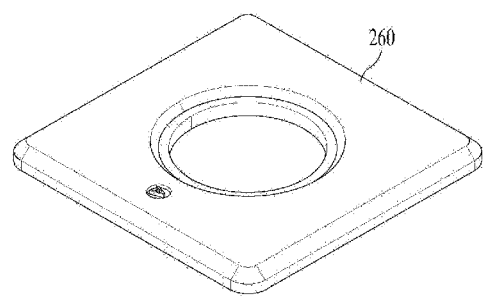
[FIG. 3]
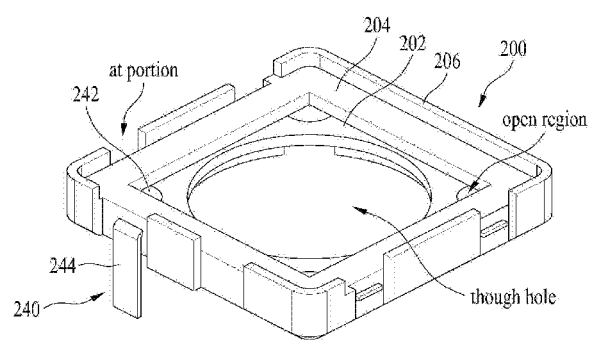

【FIG. 4】
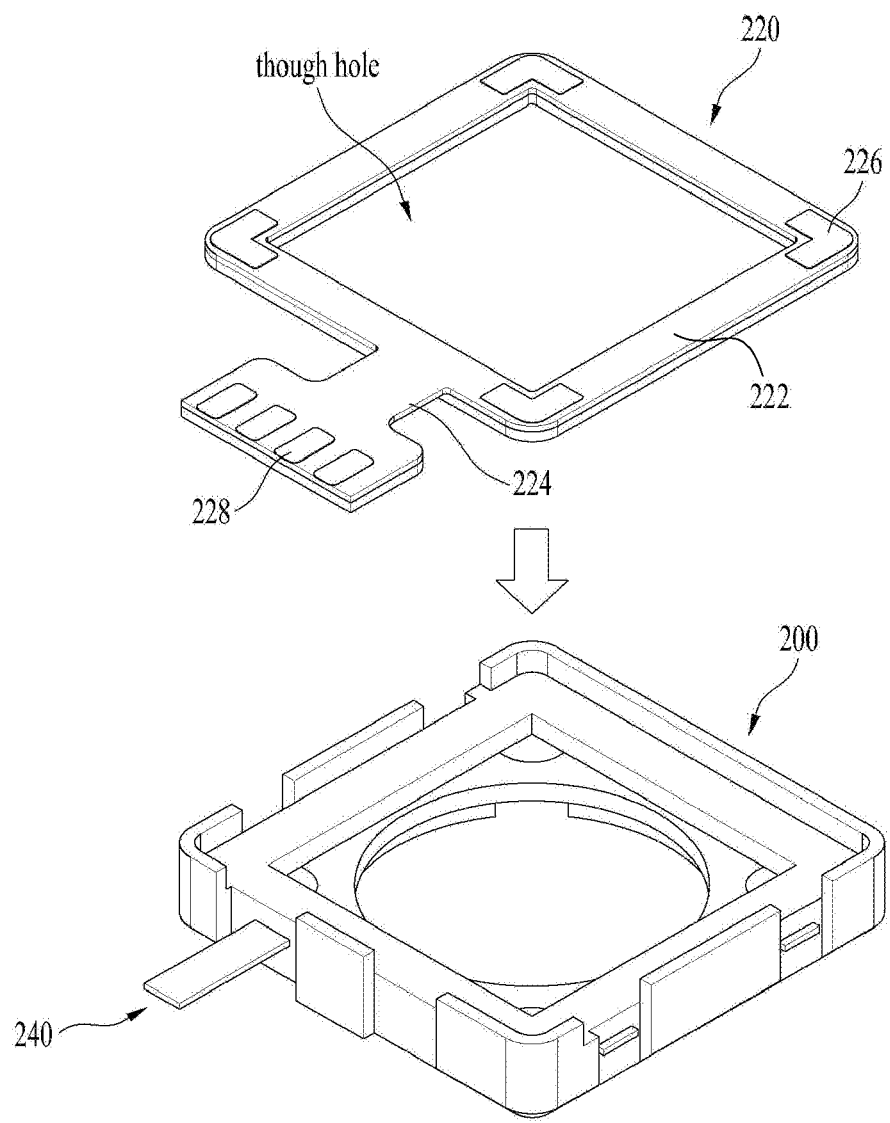

【FIG. 5】
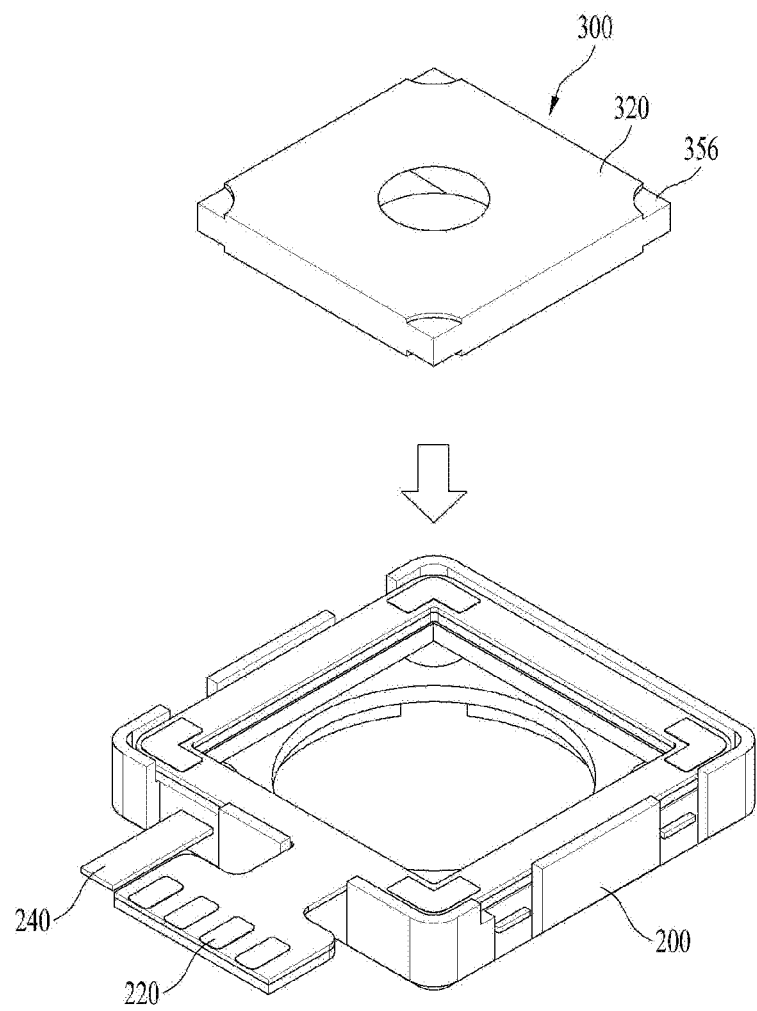

【FIG. 6】
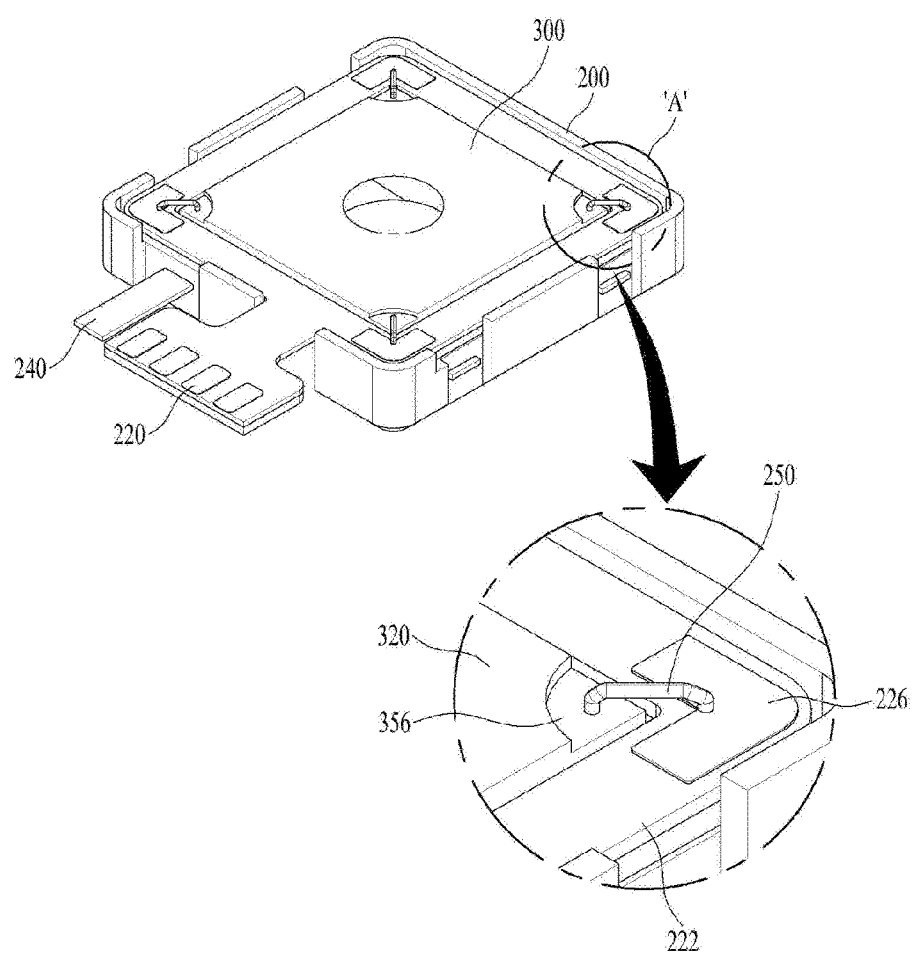

【FIG. 7】
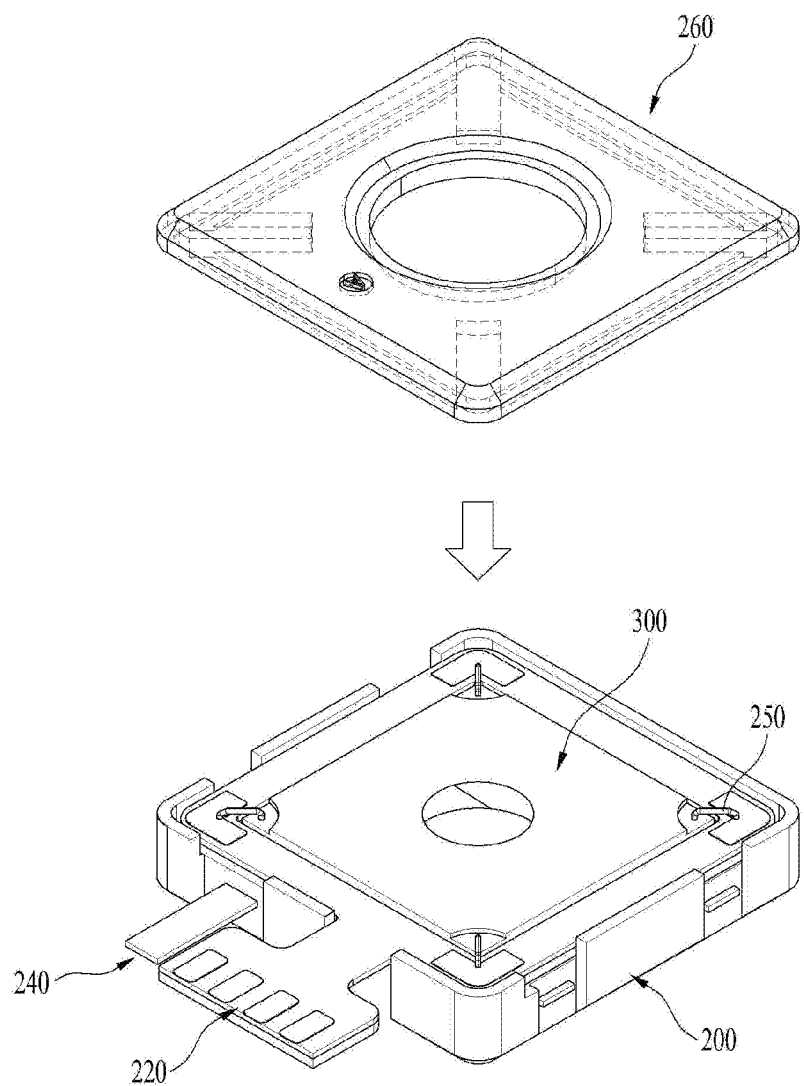

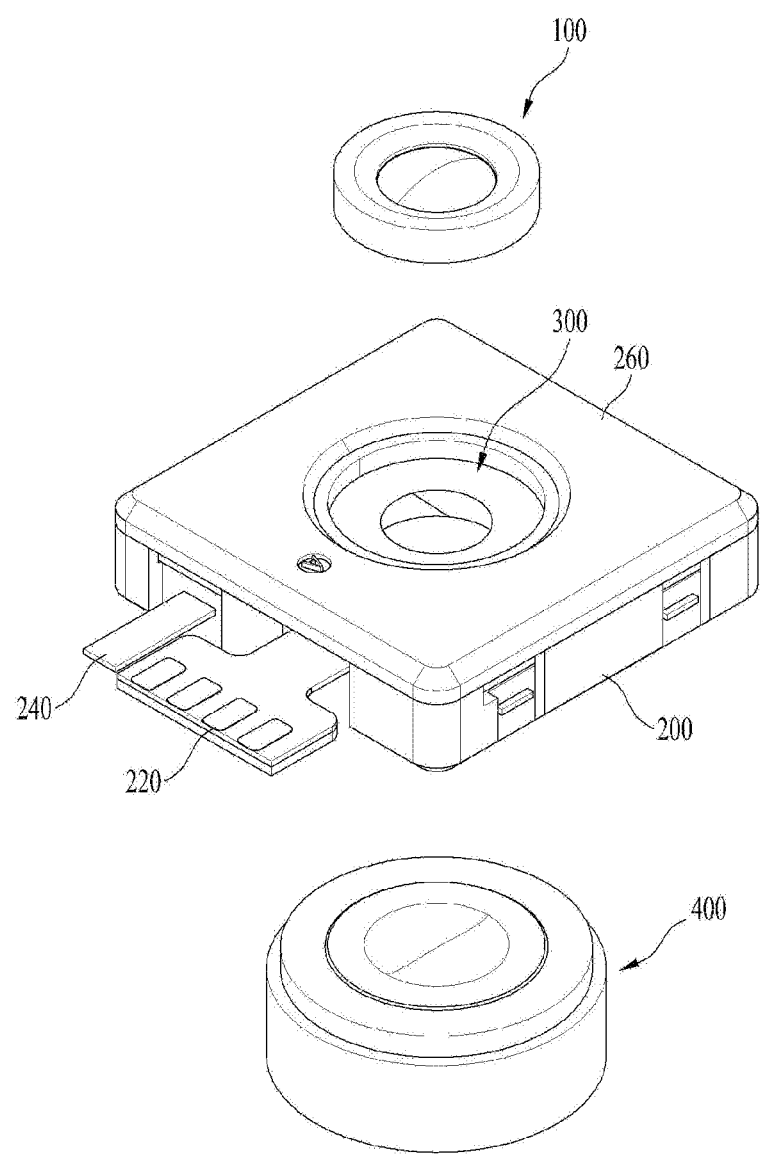
[FIG. 8]

【FIG. 9】
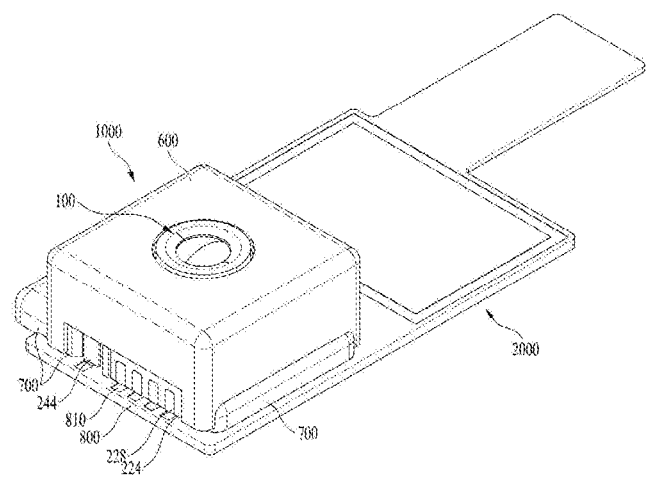
【FIG. 10】
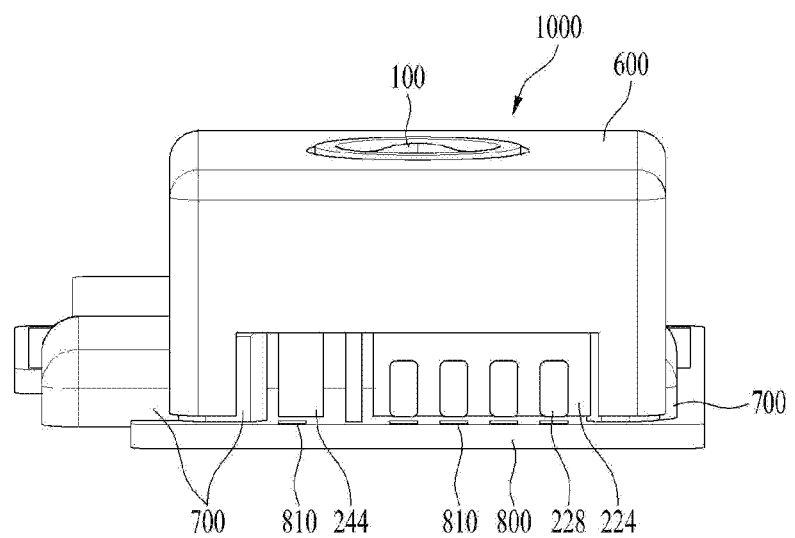

LIQUID LENS MODULE, CAMERA MODULE INCLUDING THE SAME, OPTICAL DEVICE INCLUDING THE SAME, AND METHOD FOR MANUFACTURING THE LIQUID LENS MODULE

CROSS REFERENCE TO RELATED APPLICATIONS

This application is the National Phase of PCT International Application No. PCT/KR2018/001176, filed on Jan. 26, 2018, which claims priority under 35 U.S.C. 119(a) to Patent Application No. 10-2017-0013051, filed in the Republic of Korea on Jan. 26, 2017, all of which are hereby expressly incorporated by reference into the present application.

TECHNICAL FIELD

Embodiments relate to a liquid lens module, and more particularly to a camera module including a liquid lens module, an optical device including the same, and method for manufacturing the liquid lens module.

BACKGROUND ART

People who use portable devices demand optical devices that have high resolution, are small, and have various photographing functions (an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased.

The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens moving apparatus is used to move the lens module. However, the lens moving apparatus consumes a lot of power, requires driving members, such as magnets and coils, to move the lens module, and requires extra space corresponding to the moving range of the lens module in order to move the lens module, thus leading to an increase in the overall thickness of a camera module and an optical device.

Therefore, research has been conducted on a liquid lens configured to electrically adjust the curvature of an interface between two kinds of liquid in order to perform autofocus and hand-tremor compensation functions.

DISCLOSURE

Technical Problem

Embodiments provide a camera module capable of performing AF or OIS functions using a liquid lens and an optical device.

Embodiments provide a camera module using a liquid lens and an optical device, in which a liquid lens and a solid lens are aligned with each other and are stably connected to an external electrode, thus securing a robust structure and improving assembly efficiency.

Technical Solution

In one embodiment, a liquid lens module may include a first housing including a first hole formed therein to allow a first lens unit to be coupled thereto, a lower connection substrate coupled to the first housing, an upper connection substrate disposed on the lower connection substrate, the upper connection substrate being coupled to the first housing, and a liquid lens disposed between the lower connection substrate and the upper connection substrate, the liquid lens being electrically connected to the lower connection substrate and to the upper connection substrate, wherein the upper connection substrate may include an opening that is larger than the liquid lens, and the opening may be disposed at a position corresponding to the first hole in an optical-axis direction.

The liquid lens may include a first plate including a cavity formed therein to accommodate a first liquid, which is conductive, and a second liquid, which is non-conductive, therein, a first electrode disposed on the first plate, and a second electrode disposed under the first plate. The upper connection substrate may be electrically connected to the first electrode, and the lower electrode may be electrically connected to the second electrode.

The liquid lens module may further include a second plate disposed on the first electrode and a third plate disposed under the second electrode.

The upper connection substrate and the first electrode may be connected to each other through wire bonding.

The liquid lens module may further include a second housing disposed on the liquid lens, the second housing being coupled to the first housing and including a second hole formed therein at a position corresponding to the first hole in the optical-axis direction to allow the second lens unit to be coupled thereto.

The second hole in the second housing may face a cavity of the liquid lens, and the first hole in the first housing may face the cavity of the liquid lens.

The liquid lens module may be electrically connected to the upper connection substrate and the lower connection substrate using a conductive epoxy.

The upper connection substrate may be disposed in a corner region of the first housing.

In another embodiment, a camera module may include a liquid lens module, including a first housing including a first hole formed therein to allow a first lens unit to be coupled thereto, a lower connection substrate coupled to the first housing, an upper connection substrate disposed on the lower connection substrate and coupled to the first housing, and a liquid lens disposed between the lower connection substrate and the upper connection substrate so as to be electrically connected to the lower connection substrate and to the upper connection substrate, wherein the upper connection substrate may include an opening that is larger than the liquid lens and the opening may be disposed at a position corresponding to the first hole in an optical-axis direction, a circuit board electrically connected to the liquid lens module, and a light-receiving element disposed inside the liquid lens.

The camera module may further include a cover surrounding the liquid lens module.

The camera module may further include a second housing disposed on the liquid lens, the second housing being coupled to the first housing and including a second hole formed therein at a position corresponding to the first hole in an optical-axis direction to allow the second lens unit to be coupled thereto. The second hole in the second housing may face a cavity of the liquid lens. The first lens unit may be inserted into an opening in the second housing.

The first lens unit may include a first lens that is adjacent to the liquid lens, the size of a first opening in the upper surface of the cavity may be less than the size of the first lens, and the size of the liquid lens may be greater than the size of the first lens.

The camera module may further include a second lens unit inserted and disposed in the opening in the second housing. The second lens unit may include a second lens that is adjacent to the liquid lens, and the size of a second opening in the lower surface of the cavity may be greater than the size of an effective area of the second lens.

The upper connection substrate may be a flexible printed circuit board, a portion of the flexible printed circuit board may extend outside the first housing and may be bent toward a lower region, and the lower connection substrate may be a metal plate made of a conductive metal material.

The camera module may further include a cover surrounding the first housing, the liquid lens, and the second housing. The cover may include an opening formed in an upper surface thereof, and the opening may be disposed opposite the opening in the second housing. The cover may include an open region formed in a side surface thereof, through which the first connection substrate extends to the outside.

The upper connection substrate and the lower connection substrate may be disposed so as to extend outside the first housing.

In still another embodiment, a method of manufacturing a liquid lens module may include disposing a lower connection substrate in the lower portion of a first housing, coupling a first substrate, which is flexible and includes an upper connection substrate, to the upper portion of the first housing, disposing a liquid lens between the lower connection substrate and the first substrate, connecting a second electrode of the liquid lens to the lower connection substrate, connecting a first electrode of the liquid lens to the upper connection substrate, and disposing a second housing on the liquid lens.

Advantageous Effects

A liquid lens module and a camera module including the same according to the embodiments may perform an AF or OIS function by adjusting the interface between first and second liquids using electrical energy, thereby consuming a small amount of power compared to a configuration in which lenses are mechanically moved. In addition, a liquid lens may be inserted and secured between first and second housings, and may be securely connected to a circuit board for electrical connection therewith.

In addition, the optical axis of a liquid lens and the optical axes of first and second lens units may be easily aligned.

DESCRIPTION OF DRAWINGS

FIG. 1 is a view illustrating a liquid lens,

FIGS. 2a to 2e are views illustrating the liquid lens, first and second housings, and first and second connection substrates, FIG. 3 is a view illustrating the state in which a second connection substrate is coupled to the first housing, FIG. 4 is a view illustrating a process of coupling the first connection substrate to the structure shown in FIG. 3, FIG. 5 is a view illustrating a process of coupling the liquid lens to the structure shown in FIG. 4, FIG. 6 is a view illustrating wire bonding between the liquid lens and the first connection substrate, FIG. 7 is a view illustrating a process of coupling the second housing to the structure shown in FIG. 6, FIG. 8 is a view illustrating a process of coupling first and second lens units to the structure shown in FIG. 7, FIG. 9 is a perspective view of a camera module including the liquid lens shown in FIG. 1, and FIG. 10 is a side view of FIG. 9.

BEST MODE

Hereinafter, embodiments for accomplishing the aforementioned objects will be described with reference to the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

FIG. 1 is a view illustrating a liquid lens.

In the embodiment, the liquid lens may be modularized in first and second housings so as to be coupled to first and second lens units or to be easily assembled in a camera module.

The liquid lens 300 may include liquids, a first plate, and electrodes.

The liquids may include a conductive liquid and a non-conductive liquid. The first plate may include a cavity formed therein, and the liquids may be disposed in the cavity. The side surface of the cavity may include an inclined surface. The electrodes may be disposed on or under the first plate. The electrodes may include a common electrode (or a first electrode) and an individual electrode (or a second electrode), which may be disposed on or under the first plate. The common electrode may include one electrode sector, and a reference voltage may be applied to the electrode sector of the common electrode. The individual electrode may include a plurality of electrode sectors. Independent voltages may be applied to the electrode sectors. The shape of the interface formed by the conductive liquid and the non-conductive liquid may be adjusted by adjusting the voltage applied to the common electrode and the voltage applied to the individual electrode. A second plate or a third plate may be disposed on or under the first plate or the electrodes. The voltage applied to the electrodes may be of a pulse type.

The liquid lens 300 may include a first plate 310, a first liquid 350, a second liquid 340, a second plate 320, a third plate 330, a first electrode 355, and a second electrode 345.

In detail, the first plate 310 may include a cavity formed therein to accommodate the first liquid 350, which is conductive, and the second liquid 340, which is non-conductive, therein. The first electrode 355 may be disposed on the first plate 310, the second electrode 345 may be disposed under the first plate, the second plate 320 may be disposed on the first electrode 355, and the third plate 330 may be disposed under the second electrode 345.

The first plate 310 may be disposed between the second plate 320 and the third plate 330, and may include upper and lower openings, each having a predetermined inclined surface i (e.g. an inclined surface having an angle of about 55 to 65 degrees or an angle of 50 to 70 degrees). The region surrounded by the aforementioned inclined surface, the first opening oriented toward the second plate 320, and the second opening oriented toward the third plate 330 may be defined as a 'cavity'.

The first plate 310 is a structure that accommodates the first and second liquids 350 and 340 therein. Each of the second plate 320 and the third plate 330 may include a region through which light passes, and thus may be made of a light-transmitting material such as, for example, plastic or glass. The second plate 320 and the third plate 330 may be made of the same material for convenience of processing.

Further, the first plate 310 may include not only a transparent material through which light easily passes but also impurities so that light does not easily pass therethrough.

In the camera module, the second plate 320 is a structure through which light incident thereon from the first lens unit disposed thereabove travels to the interior of the cavity, and the third plate 330 is a structure through which the light that has passed through the cavity travels to the second lens unit disposed thereunder.

The cavity may be filled with the first liquid 350 and the second liquid 340, having different properties from each other, and an interface may be formed between the first liquid 350 and the second liquid 340. The curvature and the inclination of the interface formed between the first liquid 350 and the second liquid 340 may be changed.

That is, a configuration in which the surface tension of the first and second liquids 350 and 340 is changed using electrical energy may reduce the size of a camera module compared to a configuration in which a focal length is adjusted by moving solid lenses (adjusting the distance between the lenses), and may consume a small amount of power compared to a configuration in which lenses are mechanically moved using a motor or the like.

The first liquid 350 may be oil, specifically phenyl-based silicon oil.

The second liquid 340 may be made of, for example, a mixture of ethylene glycol and sodium bromide (NaBr).

Each of the first liquid 350 and the second liquid 340 may include at least one of a sterilizing agent or an antioxidant. The antioxidant may be a phenol-based antioxidant or a phosphorus (P)-based antioxidant. The sterilizing agent may be any one of an alcohol-based sterilizing agent, an aldehyde-based sterilizing agent, and a phenol-based sterilizing agent.

The first electrode 355 may be disposed on a portion of the upper surface of the first plate 310, and may be in direct contact with the second liquid 350. The second electrode 345 may be spaced apart from the first electrode 355, and may be disposed on the upper surface, the side surface and the lower surface of the first plate 310.

The side surface of the first plate 310 or the side surface of an insulation layer 360 may form the inclined surface or the side wall of the cavity. An insulation layer 360 may be disposed between the first electrode 355 and the liquid (the first liquid 350 or the second liquid 340).

An electrical signal received from an external circuit board may be applied to the first electrode 355 and the second electrode 345 in order to control the interface between the first liquid 350 and the second liquid 340.

The first electrode 355 and the second electrode 345 may be made of a conductive material, e.g. metal, and specifically may include chrome (Cr). Chromium or chrome is a glossy silver rigid transition metal, which is not fragile, does not readily discolor, and has a high melting point.

Further, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid charged in the cavity.

The insulation layer 360 may be disposed so as to cover the upper surface of the third plate 330 on the bottom surface of the cavity, the second electrode 345 forming the side wall of the cavity, a portion of the first electrode 355 on the upper surface of the first plate 310, the first plate 310, and the second electrode 345. The insulation layer 360 may be implemented as, for example, a parylene C coating agent, and may further include a white dye. The white dye may increase the frequency at which light is reflected by the insulation layer 360 forming the side wall i of the cavity.

As illustrated, the second liquid 340 may be disposed above the third plate 330, with the insulation layer 360 interposed therebetween, and the first liquid 350 may be in direct surface contact with the first electrode 355.

The size of the cross-section of the first opening may be greater than the size of the cross-section of the second opening. In the case in which each of the first and second openings has a circular-shaped cross-section, the size thereof may be a radius. In the case in which each of the first and second openings has a square-shaped cross-section, the size thereof may be the length of one side.

The edge of each of the second plate 320 and the third plate 330 may have a circular shape or an angular shape such as a quadrangular shape. However, the disclosure is not limited thereto.

The first electrode 355 may be exposed on at least a portion of the edge of the second plate 320, and the second electrode 345 may be exposed on at least a portion of the edge of the third plate 330.

The liquid lens may include a connection substrate disposed on or under the first plate 310. One or two or more connection substrates may be provided. For example, a first connection substrate 356 may be disposed on the first electrode 355, and a second connection substrate 346 may be disposed under the second electrode 345.

The first connection substrate 356 may be disposed on the first electrode 355 in the outer region of the second plate 320, and the second connection substrate 346 may be disposed on the second electrode 345 in the outer region of the third plate 330.

One or two or more connection substrates may be provided. A portion of the connection substrate may be connected to the electrode of the liquid lens 300, and another portion of the connection substrate may be electrically and/or physically connected to the sensor substrate on which the image sensor is disposed. The connection substrate may be bonded to the electrode of the liquid lens using a conductive epoxy, and may be soldered to the sensor substrate. Specifically, the connection substrate may include one or two or more connection terminals, and the connection terminal may be connected to the electrode of the liquid lens or to the electrode of the sensor substrate.

Although not illustrated, a conductive epoxy may be disposed between the first electrode 355 and the first connection substrate 356, and may also be disposed between the second electrode 345 and the second connection substrate 346. The first connection substrate or the second connection substrate may be electrically and/or physically connected to the first electrode or to the second electrode using a conductive epoxy.

The first and second electrodes 355 and 345 may be electrically connected to the first and second connection substrates 356 and 346, and first and second connection substrates 220 and 240, which will be described layer, may respectively have the same configurations as the connection substrates 356 and 346 described above. The first connection substrate 220 may be an upper electrode of the liquid lens module, the second connection substrate 240 may be a first substrate, and a connection electrode 226, which will be described later, may be a part of the upper electrode.

FIGS. 2a to 2e are views illustrating the liquid lens, the first and second housings, and the first and second connection substrates.

FIG. 2a is a perspective view of the first housing 200, FIG. 2b is a perspective view of the first connection substrate 220, FIG. 2c is a perspective view of the second connection substrate 240, FIG. 2d is a perspective view of the liquid lens 300, and FIG. 2e is a perspective view of the second housing 260.

FIG. 3 is a view illustrating the state in which the second connection substrate is coupled to the first housing.

The first housing 200 includes an opening or a through-hole formed in the central region thereof, and has a stepped structure at the periphery of the opening. The stepped structure may include a lower portion 202 and an upper portion 204, and a side wall 206 may be disposed on the periphery of the upper portion 204.

The side wall 206 may include a cut-out portion formed in a portion thereof, through which a portion of the first connection substrate 220 or a portion of the second connection substrate 240 may be exposed to the outside.

The lower portion 202 of the above-described stepped structure may include one or two or more (e.g. four) open regions formed in the corners thereof. A portion of the first connection substrate or a portion of the second connection substrate 240 may be exposed through the open region.

The second connection substrate 240 may be provided in the first housing 200, and may include a first connection electrode 242 and a second connection electrode 244. The first connection substrate or the second connection substrate may be disposed in the first housing in an insert-molding manner. A portion of the first connection electrode 242 may be exposed through the open region described above, and the second connection electrode 244 may extend from the side surface of the first connection electrode 242 in the downward or upward direction.

FIG. 4 is a view illustrating the process of coupling the first connection substrate to the structure shown in FIG. 3.

In the state in which the second connection substrate 240 is coupled to the lower side of the first housing 200, the liquid lens 300 may be disposed on the first housing 200, and then the first connection substrate 220 may be disposed on the first housing 200. Alternatively, the first connection substrate 220 may be disposed on the first housing 200, and then the liquid lens 300 may be disposed on the first housing 200. In detail, the liquid lens 300 may be disposed on the upper portion 204 of the stepped structure of the first housing 200.

The first connection substrate 220 may include a base portion 222, a connection terminal (or, connection electrode) 226 connected to the liquid lens 300, an extension portion 224 extending from the edge of the base portion 222, and a plurality of connection terminals 228 disposed at the end of the extension portion 224 and connected to the sensor substrate. The base portion 222 and the extension portion 224 may be made of an insulative material, and the connection terminal 226 may be made of a conductive material.

The base portion 222 may be formed in the shape of a closed curve having a rectangular periphery or an open curve having a cut-out portion formed in a portion thereof, and the connection electrode (or, connection terminal) 226 may be exposed upwards in the vertex region of the rectangle. The base portion 222 may include a through-hole or an opening formed in the center of the periphery thereof.

The extension portion 224 may extend to the outside of the first housing 200 through the cut-out portion of the first housing 200, and may be bent in the downward or upward direction, which will be described later. The connection electrodes 228 connected to the sensor substrate may be electrically connected to the connection electrode 226 connected to the electrode of the liquid lens.

Each of the first connection substrate 220 and the second connection substrate 240 may be, for example, a flexible printed circuit board.

FIG. 5 is a view illustrating the process of coupling the liquid lens to the structure shown in FIG. 4.

In the state in which the second connection substrate 240 is coupled to the first housing 200, the liquid lens 300 and the first connection substrate 220 may be disposed on the first housing 200. At this time, the liquid lens 300 may be disposed prior to the first connection substrate 220, or the first connection substrate 220 may be disposed prior to the liquid lens 300. The liquid lens 300 may be disposed in the opening or in the through-hole formed in the center of the first connection substrate 220.

At this time, the connection electrode 226 of the first connection substrate 220 may be exposed in the region indicated by 'A'.

The opening in the first housing 200 and the opening in the first connection substrate 220 may be disposed so as to face the liquid lens 300.

FIG. 6 is a view illustrating wire bonding between the liquid lens and the first connection substrate.

A portion of the second connection substrate 240, which is disposed in the lower portion of the first housing 200, may be exposed through one side surface of the first housing 200, and a portion of the first connection substrate 220, which is disposed in the upper portion of the first housing 200, may be exposed through the same side surface of the first housing 200, or may be exposed in the opposite direction (e.g. through the opposite side surface of the first housing). The liquid lens 300 may be disposed in the opening formed in the center of the first connection substrate 220.

The second connection substrate 346, which is disposed at the lower side of the liquid lens 300, may be electrically connected to the second connection substrate 240 disposed thereunder. The first connection substrate 356, which is disposed in the outer region of the second plate 320 disposed at the upper side of the liquid lens 300, may be electrically connected to the connection electrode 226 disposed at the edge of the base portion 222 of the first connection substrate 220 by, for example, bonding a wire 250 thereto.

FIG. 7 is a view illustrating the process of coupling the second housing to the structure shown in FIG. 6.

In the state in which the first and second connection substrates 220 and 240 are respectively disposed in the upper portion and the lower portion of the first housing 200, in which the liquid lens 300 is inserted into the opening in the first connection substrate 220, and in which the liquid lens 300 is electrically connected to the first connection substrate 220 via the wire 250, the second housing 260 may be disposed on the liquid lens 300.

At this time, the second housing 260 may be fitted and secured to the side wall 206 of the first housing 200. That is, the second housing 260 may serve as a cover.

The second housing may include an opening formed in the central region thereof, and the opening may be disposed so as to face the cavity in the liquid lens 300.

The liquid lens module may be manufactured through the processes shown in FIGS. 3 to 7.

In detail, as illustrated in FIG. 3, the lower electrode may be disposed in the lower portion of the first housing (e.g. through insert molding). Subsequently, as illustrated in FIG. 4, the first substrate, which is flexible and includes the upper electrode, may be coupled to the upper portion of the first housing. Subsequently, as illustrated in FIG. 5, the liquid lens may be disposed between the lower electrode and the first substrate, and the second electrode of the liquid lens may be connected to the lower electrode. At this time, the liquid lens may be connected to the lower electrode using an adhesive such as a conductive epoxy. To this end, an adhesive may be applied to the open region shown in FIG. 3. Subsequently, as illustrated in FIG. 6, the first electrode may be connected to the first substrate through wire bonding or the like. Subsequently, as illustrated in FIG. 7, the second housing may be disposed on the liquid lens. When the liquid lens module is manufactured, at least some of the above steps may be combined, or the sequence of the steps may be changed.

FIG. 8 is a view illustrating the process of coupling the first and second lens units to the structure shown in FIG. 7.

The second lens unit 400 and the first lens unit 100 may be respectively inserted and disposed in the opening (not shown) formed in the central region of the first housing 200 and the opening formed in the central region of the second housing 260. Here, each of the first lens unit 100 and the second lens unit 400 may include a plurality of lenses.

As illustrated in FIG. 8, the first lens unit 100 may be simply fitted into the second hole in the second housing 260 of the liquid lens module, and the second lens unit 200 may be simply fitted into the first hole in the first housing 200.

In order to distinguish the first and second lens units 100 and 400 from the liquid lens 300, the first and second lens units 100 and 400 may be referred to as first and second solid lens units or first and second optical lens units, and may be made of a glass-based or plastic-based material.

The size of the above-described first opening in the upper surface of the cavity of the liquid lens 300 may be larger than the size of the effective area of the first lens unit 100. The size of the above-described second opening in the lower surface of the cavity of the liquid lens 300 may be larger than the size of the effective area of the second lens unit 400.

Here, in the case in which the first surface or the second surface of the lens is spherical or aspherical, the 'effective area' is a spherical or aspherical area, which is a path through which light travels.

In the above-described structure, all of the light incident from the first lens unit may travel to the cavity in the liquid lens 300, and the light traveling downwards from the liquid lens 300 may be incident on the entire effective area of the second lens unit.

Although not illustrated, the first housing 200 may include a protruding portion, which is disposed on the lower surface of the first housing 200 in the downward direction. In the camera module to be described later, the protruding portion may serve as a spacer that allows the liquid lens module to be maintained at a constant interval from the sensor substrate or a circuit board 800 disposed thereunder.

FIG. 9 is a perspective view of a camera module including the liquid lens shown in FIG. 1, and FIG. 10 is a side view of FIG. 9.

The camera module may include a lens assembly 1000, which includes a plurality of lenses including a liquid lens unit, the focal length of which is adjusted according to a driving voltage applied between a common terminal and a plurality of individual terminals, and a control circuit 2000 for supplying a driving voltage to the liquid lens.

The configuration of the control circuit 2000 may be designed differently in accordance with the specifications required for a photographing device. In particular, in order to reduce the intensity of the operating voltage applied to the lens assembly 1000, the control circuit 2000 may be implemented as a single chip. As a result, it is possible to further reduce the size of the camera module that is mounted in a portable device.

The lens assembly 1000 may be configured such that a cover 600 surrounds the upper surface and the side surfaces of the structure in which the first and second housings 200 and 260, the first and second connection substrates 220 and 240, the liquid lens 300, and the first and second lens units 100 and 400 are assembled together.

The cover 600 may include an opening formed in the upper surface thereof, through which the first lens unit 100 is exposed. Light may be incident through the opening from the outside. Here, the opening formed in the upper surface of the cover 600 may be opposite the opening formed in the above-described second housing.

The illustrated structure of the lens assembly 1000 is just one example, and the structure of the lens assembly 1000 may be changed depending on the specifications required for the camera module.

The first lens unit 100 may be disposed at the front side of the lens assembly 1000, and may receive light incident thereon from outside the lens assembly 1000. The first lens unit 100 may include a plurality of lenses, and the lenses may be aligned along a center axis to form an optical system. Here, the center axis may be the same as the optical axis of the optical system.

An exposure lens (not shown) may be provided on the front surface of the first lens unit 100, and a cover glass may be disposed in front of the exposure lens. The exposure lens may protrude so as to be exposed to the outside of the cover 600, and thus the surface thereof may be damaged.

If the surface of the lens is damaged, the quality of an image captured by the camera module may be deteriorated. In order to prevent or suppress damage to the surface of the exposure lens, a method of disposing a cover glass, a method of forming a coating layer, or a method of forming the exposure lens using a wear-resistant material for preventing damage to the surface of the exposure lens may be applied.

The cover 600 and the structures provided inside the cover 600 may be disposed on the base 700. A light-receiving element (not shown) may be disposed under the second lens unit 400, and the light-receiving element may be, for example, an image sensor.

As illustrated, the cover 600 may include an open region, which is formed by cutting a portion of one side surface of the cover 600, and the first connection substrate and the second connection substrate may extend so as to be exposed to the outside through the open region. In detail, the first electrode, which extends so as to be exposed to the outside, may be the extension portion 224 and the pads 228, and the second electrode, which extends so as to be exposed to the outside, may be the second connection electrode 244.

The connection electrodes 228 of the first connection substrate 220 and the second connection electrode 244 of the second connection substrate 240 may be electrically connected to pads 810 of the circuit board 800 disposed thereunder.

The extension portion 224 and the pads 228, which are the first electrode extending so as to be exposed to the outside, and the second connection electrode 244, which is the second electrode extending so as to be exposed to the outside, may protrude to the outside through one side surface of the first housing 200, and may be disposed in the downward direction, as described above with reference to FIG. 5.

In the case in which the first and second connection substrates are provided together at one side surface of the lens assembly 1000, from which a portion of the cover 600 is removed, the regions that are in contact with the pads 810 of the circuit board 800 may be disposed adjacent to each other.

The liquid lens and the camera module including the same according to the embodiment may reduce the size of the camera module by changing the surface tension of the first and second liquids using electrical energy, and may consume a small amount of power by performing an AF or OIS function using electrical energy compared to a configuration in which lenses are mechanically moved.

The liquid lens may be inserted and secured between the first and second housings. The second electrode of the liquid lens may be in surface contact with the second connection electrode disposed thereunder, and the first electrode thereof may be electrically connected to the first connection electrode disposed thereabove through wire bonding.

The liquid lens may be secured to the correct position using the first and second housings, and the first and second lens units may also be secured to the correct positions through the openings in the first and second housings, with the result that the optical axis of the liquid lens and the optical axes of the first and second lens units may be accurately aligned.

The liquid lens module may be coupled to the above-described first and second lens units, may be inserted into the holder, and may be disposed inside the camera module. In the camera module, a light-receiving element such as an image sensor may be disposed under the liquid lens module. The light-receiving element may be provided in the sensor substrate together with the circuit substrate. The width and/or the length of a unit pixel of the image sensor may be, for example, 2 µm (micrometers) or less.

The camera module including the above-described liquid lens module may be mounted in various digital devices, such as a digital camera, a smartphone, a laptop computer, and a tablet PC. In particular, the camera module may be mounted in mobile devices to realize an ultra-thin high-performance zoom lens.

For example, a digital device, in which the camera module, including the liquid lens, the first and second lens units, the filter, and the light-receiving element, converts an image incident from the outside into an electrical signal, may include a display module including a plurality of pixels, the colors of which are changed by the electrical signal. The display module and the camera module may be controlled by a control unit.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

INDUSTRIAL APPLICABILITY

A liquid lens module and a camera module including the same according to the embodiments may be used in mobile devices.

The invention claimed is:

1. A liquid lens module, comprising:
a first housing comprising a first hole formed therein to allow a first lens unit to be coupled thereto;
a lower connection substrate coupled to the first housing;
an upper connection substrate disposed on the lower connection substrate, the upper connection substrate being coupled to the first housing; and
a liquid lens disposed between the lower connection substrate and the upper connection substrate, the liquid lens being configured to be electrically connected to the lower connection substrate and to the upper connection substrate,
wherein the upper connection substrate comprises an opening that is larger than the liquid lens, and
wherein the opening is disposed at a position corresponding to the first hole in an optical-axis direction.

2. The liquid lens module according to claim 1, wherein the liquid lens comprises:
a first plate comprising a cavity formed therein to accommodate a first liquid, which is conductive, and a second liquid, which is non-conductive, therein;
a first electrode disposed on the first plate; and
a second electrode disposed under the first plate,
wherein the upper connection substrate is configured to be electrically connected to the first electrode, and the lower connection substrate is configured to be electrically connected to the second electrode.

3. The liquid lens module according to claim 2, further comprising a second housing disposed on the liquid lens, the second housing being coupled to the first housing and comprising a second hole formed therein at a position corresponding to the first hole in the optical-axis direction to allow a second lens unit to be coupled thereto.

4. The liquid lens module according to claim 3, wherein the second hole in the second housing faces the cavity of the liquid lens, and the first hole in the first housing faces the cavity of the liquid lens.

5. The liquid lens module according to claim 2, wherein the liquid lens further comprises:
a second plate disposed on the first electrode; and
a third plate disposed under the second electrode.

6. The liquid lens module according to claim 2, wherein the upper connection substrate and the first electrode are connected to each other through wire bonding.

7. The liquid lens module according to claim 1, wherein the liquid lens is configured to be electrically connected to the upper connection substrate and to the lower connection substrate using a conductive epoxy.

8. The liquid lens module according to claim 1, wherein the upper connection substrate is disposed at a corner region of the first housing.

9. An optical device comprising a camera module according to claim 1.

10. A camera module, comprising:
a first lens unit;
a first housing comprising a first hole formed therein to allow the first lens unit to be disposed therein;
a lower connection substrate coupled to the first housing;
an upper connection substrate disposed on the lower connection substrate, the upper connection substrate being disposed in the first housing;
a liquid lens disposed between the lower connection substrate and the upper connection substrate, the liquid lens being configured to be electrically connected to the lower connection substrate and to the upper connection substrate; and a circuit board on which an image sensor is disposed, the circuit board being electrically connected to the lower connection substrate and to the upper connection substrate.

11. The camera module according to claim 10, further comprising:
a second housing disposed on the liquid lens, a second housing being coupled to the first housing and comprising a second hole formed therein at a position corresponding to the first hole in an optical-axis direction to allow the second lens unit to be coupled thereto,
wherein the second hole in the second housing faces a cavity of the liquid lens, and
wherein the first lens unit is inserted into an opening in the second housing.

12. The camera module according to claim 11, wherein the first lens unit includes a first lens that is adjacent to the liquid lens,
wherein the size of an opening in an upper surface of a cavity formed therein to accommodate a first liquid, which is conductive, and a second liquid, which is non-conductive, therein is less than the size of the first lens, and
wherein the size of the liquid lens is greater than the size of the first lens.

13. The camera module according to claim 11, further comprising a second lens unit inserted and disposed in the opening in the second housing,
wherein the second lens unit includes a second lens that is adjacent to the liquid lens, and
wherein the size of an opening in a lower surface of a cavity formed therein to accommodate a first liquid, which is conductive, and a second liquid, which is non-conductive, therein is greater than the size of an effective area of the second lens.

14. The camera module according to claim 11, further comprising a cover surrounding the first housing, the liquid lens, and the second housing,
wherein the cover includes an opening formed in an upper surface thereof, the opening being disposed opposite an opening in the second housing, and
wherein the cover includes an open region formed in a side surface thereof, through which the upper or lower connection substrate extends to the outside.

15. The camera module according to claim 14, wherein the upper connection substrate and the lower connection substrate are disposed so as to extend outside the first housing.

16. The camera module according to claim 10, wherein the upper connection substrate is a flexible printed circuit board,
wherein a portion of the flexible printed circuit board extends to an outside of the first housing, and is bent toward a lower region, and
wherein the lower connection substrate is a metal plate made of a conductive metal material.

17. The camera module according to claim 10, wherein the lower connection substrate is disposed in the first housing in an insert-molding manner.

18. The camera module according to claim 10, further comprising a light-receiving element disposed inside the liquid lens.

19. The camera module according to claim 10, further comprising a cover surrounding the liquid lens module.

20. A method of manufacturing a liquid lens module, comprising:
disposing a lower connection substrate in a lower portion of a first housing;
coupling a first substrate, which is flexible and includes an upper connection substrate, to the upper portion of the first housing;
disposing a liquid lens between the lower connection substrate and the first substrate, the liquid lens including first and second electrodes;
connecting the second electrode of the liquid lens to the lower connection substrate and connecting the first electrode of the liquid lens to the upper connection substrate; and
disposing a second housing on the liquid lens.

* * * * *